United States Patent [19]
Mirtain

[11] 3,881,538
[45] May 6, 1975

[54] PNEUMATIC TIRES AND BREAKERS THEREFOR

[75] Inventor: Henri J. Mirtain, Compiegne, France

[73] Assignee: Uniroyal, a Societe Anonyme, Clairoix, France

[22] Filed: June 6, 1973

[21] Appl. No.: 367,467

[30] Foreign Application Priority Data
Aug. 11, 1972 France .............................. 72.29181

[52] U.S. Cl. .................... 152/361 FP; 152/361 DM
[51] Int. Cl. .............................................. B60c 9/18
[58] Field of Search... 152/361 R, 361 FP, 361 DM, 152/357

[56] References Cited
UNITED STATES PATENTS

| 3,175,598 | 3/1965 | Cegnar | 152/361 R |
| 3,404,721 | 10/1968 | Massoubre | 152/361 FP |
| 3,516,468 | 6/1970 | Jones | 152/361 FP |
| 3,613,763 | 10/1971 | Fletcher | 152/361 FP |
| 3,656,533 | 3/1972 | Barassi et al. | 152/361 DM |
| 3,799,230 | 3/1974 | Montagne | 152/361 FP |

Primary Examiner—Drayton E. Hoffman
Attorney, Agent, or Firm—Philip Sands, Esq.

[57] ABSTRACT

A multi-ply reinforcing breaker for a radial ply tire, the breaker comprising a plurality of plies superposed upon one another which decreases successively in span axially of the tire from the radially innermost ply to the radially outermost ply. The innermost ply is folded at its ends to in part overlap at least one of the others and, thereby, resist edge separation of the plies from one another.

9 Claims, 6 Drawing Figures

PNEUMATIC TIRES AND BREAKERS THEREFOR

BACKGROUND OF THE INVENTION

This invention relates to pneumatic tires for vehicles and more particularly to tread reinforcements or breakers for the type of tires generally called "radial" or "radial ply" tires.

The expressions radial tires and "radial ply tires" as commonly used in the pneumatic tire art may be said to include various tire constructions having a carcass or body comprising one or more reinforcement plies of weftless cord fabric extending from bead to bead wherein the cords in each ply are substantially radial in orientation, i.e. the cords are oriented substantially normal to the beads and the crown centerline of the tire. In a monoply radial tire construction, the carcass or body cords normally have a 90° bias angle, i.e. in the unshaped carcass they extend perpendicular to the planes of the beads. In a two-ply radial tire construction, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these body carcass constructions are contemplated within the scope and meaning of the expressions radial and "substantially radial" as used herein.

Radial tires are also generally provided with a tread reinforcement comprising a breaker or belt interposed between the tread and the crown region of the carcass, such breaker being comprised of one or more plies of rubberized, usually weftless, cord fabric. In such a breaker ply the cords are made of generally inextensible materials, e.g. metallic wires, glass filaments, polyester filaments, etc., and are both parallel to each other as well as oriented at a low bias angle, i.e. they are oriented substantially parallel to the bead planes and thus circumferentially of the tire. In the case of a monoply breaker structure, this bias angle may be 0°, but in the most usual case, where the breaker is a multiply structure, similar but opposed low bias angle orientations of the cords, ranging up to about 10° to the median circumferential or equatorial plane of the tire, are employed in successive plies.

For normal uses, the traditional breakers made up of a plurality of plies of rubberized metallic wires or cords, in each of which plies the cords are parallel to one another and oriented at a respective low bias angle relative to the median circumferential or equatorial plane of the tire, give excellent results.

Such breaker assemblies may, for example, comprise three plies which are superposed upon one another, the plies successively decreasing in span axially of the tire such that the innermost ply which is closest to the axis of rotation of the tire has a greater axial span than a second ply overlying the first ply, and a third ply overlying the second ply has an axial span which is less than that of the second ply. The first ply, which has the greatest axial span, may, for example, be provided with a pair of folded marginal edge portions which overlap the second and third plies.

It has been determined that such breaker assemblies are not highly durable in that the ply components thereof tend to separate or detach from one another along their respective edges. Thus, since the edge portions of the respective plies are generally independent of one another, the tires in which such breaker assemblies are provided often exhibit excessive wear in the vicinity of the tire shoulders.

SUMMARY OF THE INVENTION

Accordingly, it is an object of the present invention to provide a breaker assembly for a pneumatic tire in which the edge portions of the various plies of the breaker assembly cooperate with one another as a unit and not independently of one another.

It is another object of the present invention to provide a breaker assembly for a pneumatic tire which reduces the extent of wear in the vicinity of the tire shoulders.

To this end, the present invention relates generally to a breaker assembly for a pneumatic tire, the breaker assembly comprising a first ply, a second ply overlying the first ply, and a third ply overlying the second ply. The first ply has a greater axial span than the second ply and terminates in a pair of folded marginal edge portions which overlie at least in part the second ply. The third ply has a lesser axial span than the second ply and terminates in a pair of oppositely directed edges which are proximate and substantially coplanar with at least a substantial extent of the folded marginal edge portions of the first ply.

BRIEF DESCRIPTION OF THE DRAWINGS

The foregoing and other objects, characteristics, and advantages of the present invention will be more clearly understood from the following detailed description thereof when read in conjunction with the accompanying drawings, in which.

DETAILED DESCRIPTION OF THE INVENTION

Figure 1:
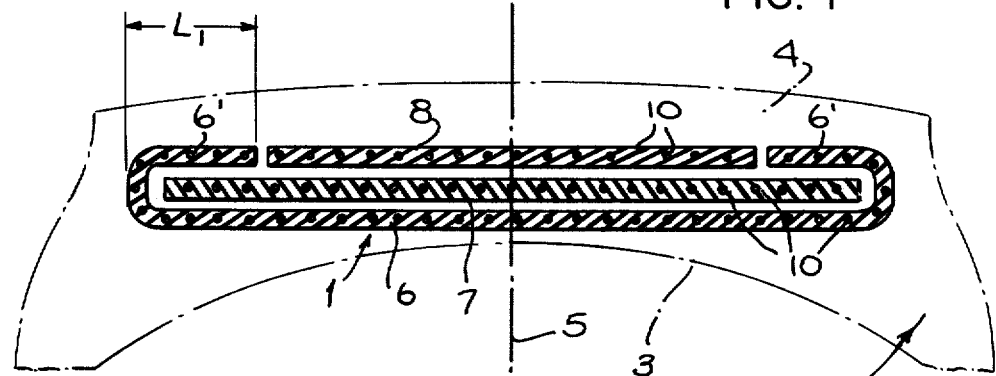
FIG. 1 is a cross-sectional view of the breaker assembly pursuant to one embodiment of the present invention, the breaker assembly being illustrated within the crown region of a pneumatic tire which is shown fragmented and in phantom.
Figure 4:
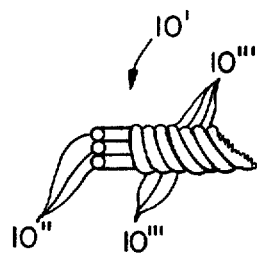
FIG. 4 is a fragmentary perspective view of one embodiment of a breaker-reinforcing cord.
Figure 5:
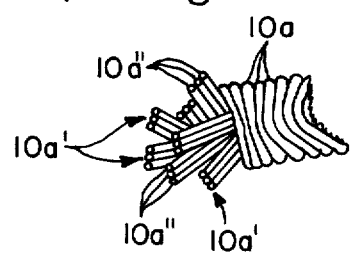
FIG. 5 is a fragmentary perspective view of a second embodiment of a breaker-reinforcing cord.

Referring now to the drawings, and more particularly to FIG. 1, there is illustrated a breaker assembly generally designated by the reference character 1 pursuant to one embodiment of the present invention. The breaker assembly 1 is disposed within the crown region of a pneumatic tire 2 between a radial ply carcass 3 of the tire 2 and a tread 4. The breaker assembly 1 has a generally annular extent and is disposed symmetrically relative to a median equatorial plane 5 of the tire 2. The breaker assembly 1 includes a first ply 6, a second ply 7 overlying the first ply 6, and a third ply 8 overlying the second ply 7.

As illustrated, the first ply 6 has a greater axial span than that of each of the plies 7 and 8. On the other hand, the second ply 7 has a greater axial span than that of the ply 8. Pursuant to the embodiment of FIG. 1, the first ply 6 is provided with a pair of folded marginal end portions 6' which are directed toward one another and overlie the opposite end portions of the second ply 7 by an amount $L_1$ within a range of preferably 15–30 mm. The third ply 8 which overlies the second ply 7 terminates in a pair of oppositely directed edges which are proximate or adjacent to the edges of the marginal edge portions 6' of the ply 6. Moreover, the folded marginal edge portions 6' of the ply 6 are in entirety substantially coplanar with the third ply 8.

Accordingly, because of the juxtaposition of the opposite edges of the third ply 8 with that of the terminal edges of the marginal edge portion 6' of the ply 6, and because of the relationship of the opposite end portions of the second ply 7 with that of the folded marginal edge portions 6' of the ply 6 which overlie, in part, the second ply 7, the respective edges of the superposed plies 6, 7 and 8 cooperate with one another effectively as a unit, and not independently from one another, to resist edge separation when subjected to stress and shock.

Figure 2:
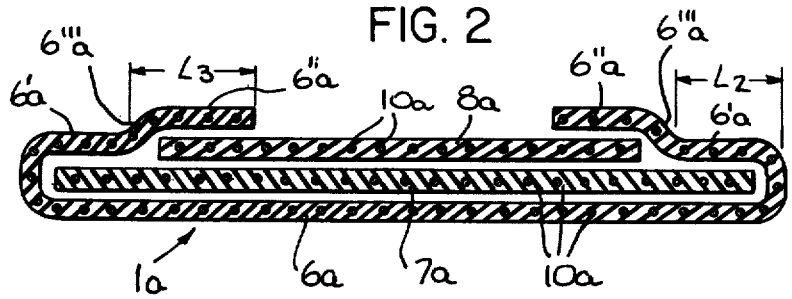
FIG. 2 is a cross-sectional view of an alternate embodiment of the present invention.
Figure 6:
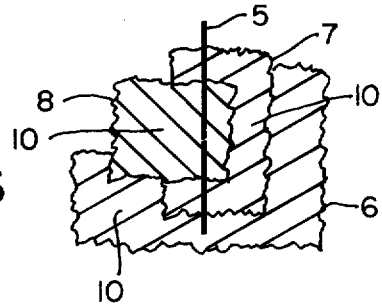
FIG. 6 is a fragmentary plan view of the breaker plies.
Figure 3:
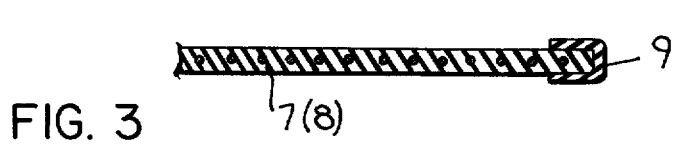
FIG. 3 is a fragmentary cross-sectional view of one ply of the breaker assembly pursuant to one or both of the embodiments illustrated in FIGS. 1 and 2, respectively.

Pursuant to an alternate embodiment of the present invention, there is illustrated in FIG. 2 a breaker assembly generally designated by the reference character 1a. In this instance likewise, the breaker assembly 1a is comprised of a first ply 6a, a second ply 7a overlying the first ply 6a, and a third ply 8a overlying the second ply 7a. The first ply 6a has an axial span which is substantially greater than that of the second ply 7a, whereas the third ply 8a has a substantially lesser axial span than that of the second ply 7a.

The first ply 6a is provided with a pair of folded marginal edge portions each of which is generally divided into a first section 6'a and a second section 6''a through the intermediary of a bent transition zone 6'''a. The section 6'a of each of the folded marginal edge portions overlies a respective end portion of the second ply 7a, whereas the second section 6''a of each of the folded marginal edge portions overlies the opposite end portions of the third ply 8a. The axial extent $L_2$ and $L_3$ of the sections 6'a and 6''a, respectively, is each preferably within a range of approximately 15–30 mm.

As illustrated in FIG. 2, the oppositely directed edges of the third ply 8a are in very close proximity with the bent transition zones 6'''a, the axial extent of the third ply 8a being substantially coplanar with the first section 6'a of each of the folded marginal edge portions of the ply 6a. In this embodiment likewise, because of the proximity of the opposite edges of the third ply 8a with that of the transition zones 6'''a of the folded marginal edge portions, respectively, of the ply 6a, and because of the overlapping relationship of the first and second sections 6'a and 6''a, respectively, with that of the second and third plies 7a and 8a, respectively, the edge portions of each of the plies cooperate with one another effectively as a unit, and not independently of one another, to resist edge separation when subjected to stress and shock.

Pursuant to a third embodiment of the present invention, or pursuant to a form of either the embodiment illustrated in FIG. 1 or that illustrated in FIG. 2, the second and/or third plies 7 and 8, respectively, may at their respective edge portions be provided with a hem-like element 9 which is constituted of either synthetic or natural rubber corresponding preferably to the material of which the plies 6, 7 and 8 are so constituted.

Each of the plies 6, 7 and 8 of the embodiment illustrated in FIG. 1, or the plies 6a, 7a and 8a of the embodiment illustrated in FIG. 2, is provided with a plurality of cords which within the respective plies extend in closely spaced parallel relation with one another. The cords are generally designated by the reference character 10 in FIG. 1 and by the reference character 10a in FIG. 2. Pursuant to one form of either of the embodiments illustrated in FIGS. 1 and 2, the cords 10 of plies 6 and 8, and the cords 10a of the plies 6a and 8a, form identical acute angles with the median equatorial plane 5 which diverge in the same general axial direction with one another. On the other hand, the cords of the second ply 7, 7a form either the same or a different acute angle with the median equatorial plane 5 but diverge in an opposite axial direction of that of the cords in the other plies.

Pursuant to a second form of either of the embodiments illustrated in FIGS. 1 and 2, the cords 10 of the plies 6 and 7, and the cords 10a of the plies 6a and 7a, form identical acute angles relative to the common median equatorial plane and diverge in the same general axial direction with one another. However, in this instance the cords 10 of the ply 8 or the cords 10a of the ply 8a, from either the same or a different acute angle relative to the median equatorial plane 5 but diverge in a generally opposite axial direction of that of the cords in the plies 6 and 7 or in the plies 6a and 7a.

Pursuant to still a third form of either of the embodiments illustrated in FIGS. 1 and 2, it is preferable that the reinforcing cords 10 in the plies 7 and 8, and the cords 10a in the plies 7a and 8a, have a lesser pliability than the cords in the first ply 6 or 6a. In this respect, it is preferred that the cords 10 in the plies 7 and 8, and the cords 10a in the plies 7a and 8a, be constituted of steel, and that the cords 10 or 10a in the plies 6 or 6a, respectively, be constituted or synthetic textile material or of thinner and more pliable steel than that of the steel cords in the plies 7, 7a and 8, 8a.

With regard to the latter discussed feature, it is preferred that the cords 10 in the plies 7 and 8, or the cords 10a in the plies 7a and 8a, be of the type which comprises a single strand 10 of three steel filaments 10''. The strand has a diameter of approximately 0.20 mm. and is surrounded by an array of six spiral-wound filaments 10''' each of which has a diameter of approximately 0.38 mm. On the other hand, the cords 10 in the plies 6 and the cords 10a in the ply 6a preferably have seven strands 10a', each strand being constituted of three steel filaments 10a'' each having a diameter of approximately 0.15 mm. The seven strands are surrounded by a single 0.15 mm. diameter filament 10a''' which is spiral-wound upon the seven strands.

In the alternative, the cords 10 and 10a in the plies 6 and 6a, respectively, may be constituted of a textile material sold under the trade name "Fiber B" manufactured by the French company E. I. du Pont de Nemours, or of a material sold under the trademark "Vinal" manufactured by the Japanese company Kuraray Company, Limited, or of nylon, polyester, fiberglass and the like. The nature of the cords 10 and 10a in the embodiments of FIGS. 1 and 2, respectively, is such that the different cord reinforced plies resist separation from one another along their respective edges and have a desireable measure of stiffness.

It is also preferable that the cords 10 and 10a in the embodiments of the FIGS. 1 and 2, respectively, and specifically in the plies 7 and 8, and the plies 7a and 8a, form identical acute angles relative to the median equatorial plane 5 of the tire in the range of 14 through 25°, whereas the cords in the plies 6 or 6a form a different angle relative to the median equatorial plane 5 within a range of 22 through 90°.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A pneumatic tire comprising a radial ply carcass having a crown region, a tread overlying said crown region, and a breaker assembly interposed between said tread and carcass, the breaker assembly comprising a first ply, a second ply overlying said first ply, and a third ply overlying said second ply, said first ply having a greater axial span than said second ply and terminating in a pair of folded marginal edge portions overlying at least in part said second ply, said third ply having a lesser axial span than said second ply and terminating in a pair of oppositely directed edges which are proximate and substantially coplanar with at least a substantial extent of each of said folded marginal edge portions of said first ply, each of said folded marginal edge portions of said first ply including a bent transition zone which divides said edge portions each into a pair of integral sections, one section of each of said edge portions overlying said second ply and being coplanar with said third ply, the other section of each of said edge portions overlying said third ply.

2. A tire as claimed in claim 1, wherein at least said second ply includes a pair of oppositely directed hemmed edges.

3. A tire as claimed in claim 2, wherein said oppositely directed edges of said third ply are hemmed.

4. A tire as claimed in claim 1, wherein each of said sections of each of said folded marginal edge portions has an axial extent within the range of 15–30 mm.

5. A tire as claimed in claim 1, wherein said first ply includes reinforcing cords therein, said second and third plies including reinforcing cords therein of lesser pliability than the cords in said first ply.

6. A tire as claimed in claim 5, wherein the cords in said first ply are non-metallic and the cords in said second and third plies are metallic.

7. A tire as claimed in claim 5, wherein the cords in said first ply include seven strands of three filmanets, said strands being surrounded by a single spiral-wound filament, the cords in said second and third plies each including a single strand of three filaments, the latter said strand being surrounded by an aarray of six spiral-wound fialments.

8. A tire as claimed in claim 1, wherein said first, second and third plies each includes a plurality of cords therein, the cords in said first and second plies being commonly inclined in one general axial direction relative to a median equatorial plane of the tire, the cords in said third ply being inclined in a generally opposite axial direction relative to said plane.

9. A tire as claimed in claim 1, wherein said first, second and third plies each includes a plurality of cords therein, the cords in said first and third plies being commonly inclined in one general axial direction relative to a median equatorial plane of the tire, the cords in said second ply being inclined in a generally opposite axial direction relative to said plane.

* * * * *